April 11, 1967     U. A. POMMERENING     3,314,062
ANALOG-TO-DIGITAL CONVERTER
Filed Oct. 17, 1963     2 Sheets-Sheet 1

INVENTOR.
UWE A. POMMERENING
BY
ATTORNEY

United States Patent Office 3,314,062
Patented Apr. 11, 1967

3,314,062
ANALOG-TO-DIGITAL CONVERTER
Uwe A. Pommerening, Webster, N.Y., assignor to General Dynamics Corporation, Rochester, N.Y., a corporation of Delaware
Filed Oct. 17, 1963, Ser. No. 316,832
6 Claims. (Cl. 340—347)

The present invention relates to analog-to-digital converters. Prior art analog-to-digital converters are relatively cumbersome, complicated and expensive.

Accordingly, it is the principal object of the present invention to provide new and improved analog-to-digital converters which are relatively simple, inexpensive and accurate within specified ranges.

Further objects and advantages of the invention will become apparent as the following description proceeds and the features of novelty which characterize the invention will be pointed out with particularity in the claims annexed to and forming a part of this specification.

Figure 1:
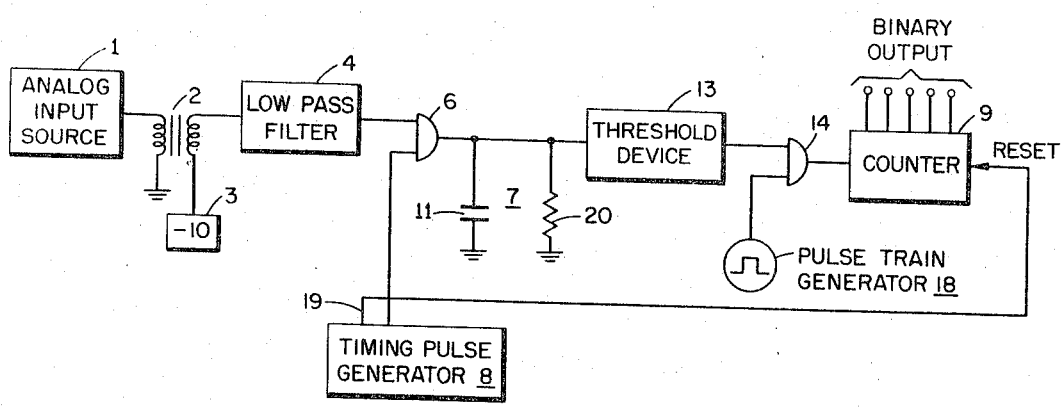
Figure 2:
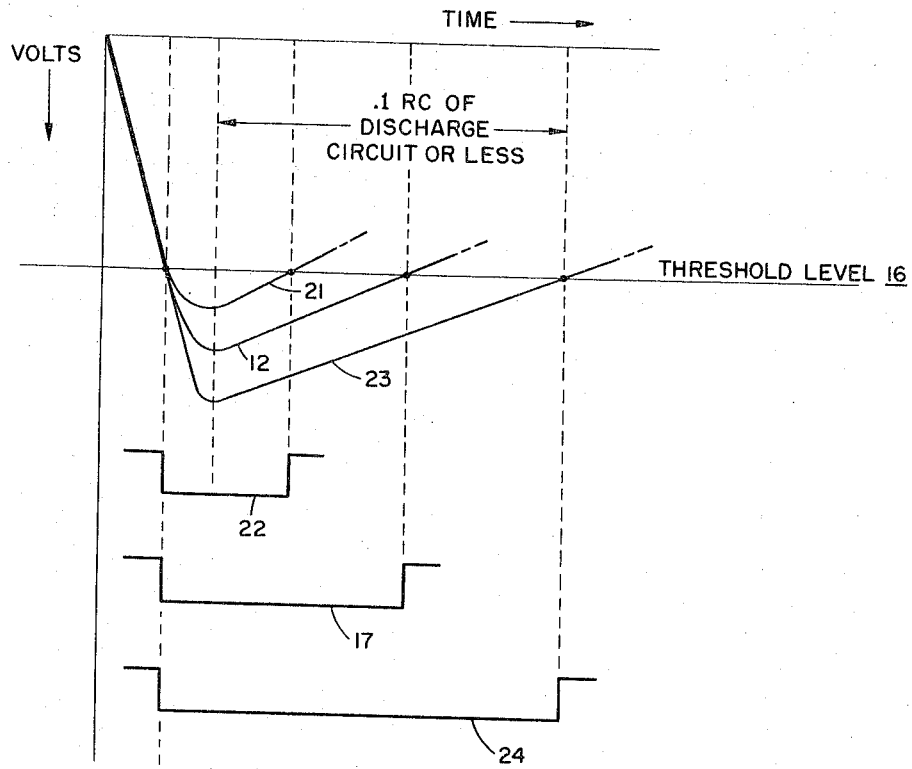
Figure 3:
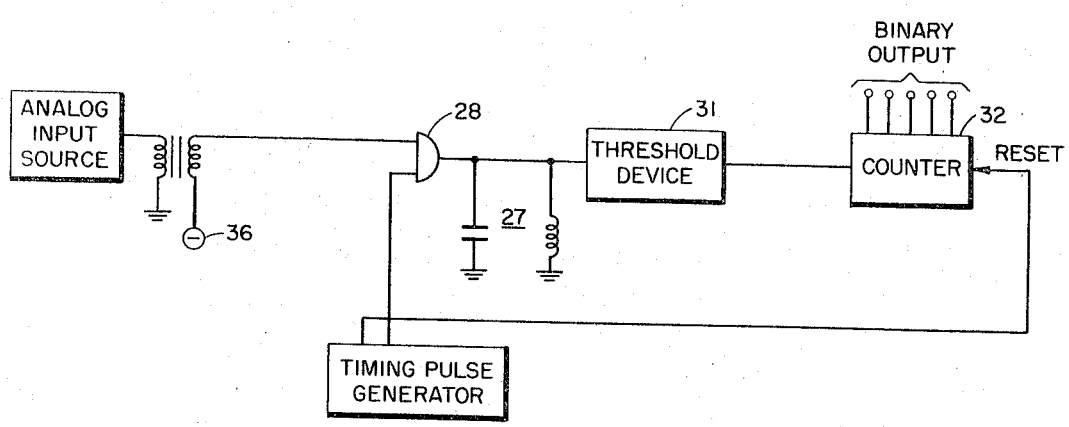

For a better understanding of the invention, reference may be had to the accompanying drawings, in which:

FIG. 1 discloses a first embodiment of the present invention;

FIG. 2 discloses a waveform diagram which will aid in the understanding of the operation of the first embodiment;

FIG. 3 discloses a second embodiment of the present invention; and

Figure 4:
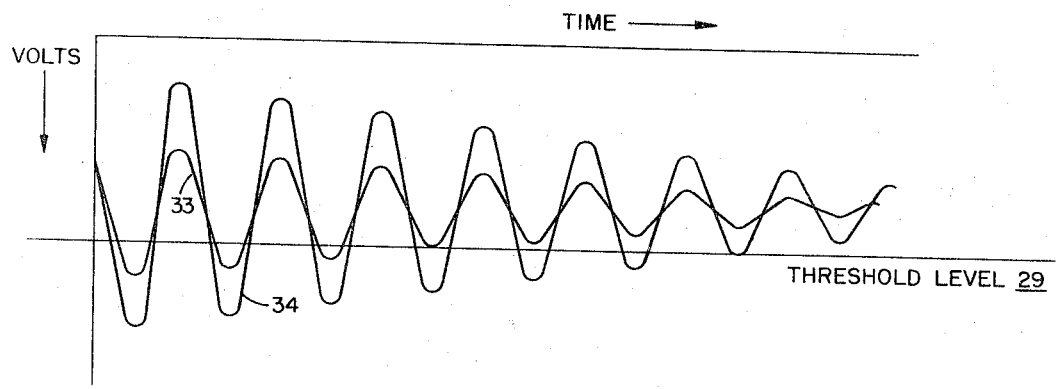

FIG. 4 discloses a waveform diagram which will aid in the understanding of the operation of the embodiment of FIG. 3.

In accordance with the present invention, the analog signal to be converted is sampled and an amount of energy is inserted into the storage circuit during a sampling period which is proportional to the amplitude of the sampled analog voltage. The energy within the storage circuit is dissipated during an energy dissipation period at a predetermined rate. The greater the amplitude of the sampled analog signal, the greater the energy inserted into the storage circuit; and, conversely the less the amplitude of the sampled analog signal, the less the energy inserted into the storage circuit. Circuitry is provided for measuring the time interval in which the energy within the storage circuit is above a predetermined amount, which interval is proportional to the amplitude of the sampled analog signal within the operating range.

In a first embodiment of the present invention, the energy derived from the sampled analog signal is inserted into a capacitor which is shunted by an energy dissipating resistor. The peak voltage built up across the capacitor will be a function of the amplitude of the sampled analog signal. A threshold device is coupled to the capacitor, which device produces a signal as long as the voltage across the capacitor remains above a predetermined level; or, in other words, as long as the energy stored within the storage circuit remains above a predetermined level. The output signal from the threshold device controls a counter gate so that a count is built up in a counter which is directly proportional to the amplitude of the sampled analog signal.

In a second embodiment, the sampled analog voltage is utilized to cause a relatively high Q oscillatory circuit comprising a capacitor and an inductor to ring. The voltage swings within the oscillatory circuit which exceed a predetermined level are counted. Within the operating range, the number of these swings above the predetermined level will be proportional to the energy inserted into the circuit, which, in turn, will be proportional to the amplitude of the sampled analog signal.

Referring now to FIG. 1, and A.C. analog input source 1 is shown coupled to the primary winding of transformer 2. The secondary winding of transformer 2 is coupled between a negative voltage terminal 3 and low-pass filter 4. As a result, a fluctuating D.C. analog signal will be applied to the first input terminal of AND gate 6, which, in turn, is coupled to energy storage circuit 7, as shown. A timing pulse generator 8 is utilized to enable sampling gate 6 for the sampling interval and at the desired frequency. This generator is also utilized to reset counter 9 just before a new sampling interval is generated to again enable AND gate 6. Timing pulse generator 8 could be a ring counter or any other electronic distributing device well known to those skilled in the art.

Let it be assumed that no analog signal is applied to the primary winding of transformer 2. Under these conditions, a steady negative D.C. voltage is produced at the output terminal of low-pass filter 4, owing to negative voltage terminal 3. AND gate 6 is enabled during the sampling interval thereby to rapidly charge capacitor 11, as shown by waveform 12 in FIG. 2. The waveforms in the upper portion of FIG. 2 represent the voltages present across storage circuit 7 or capacitor 11 under various input conditions. Upon the termination of the sampling interval when sampling gate 6 becomes disenabled, the voltage across capacitor 11 exponentially decreases, as shown in FIG. 2. Therefore, substantially all of the energy inserted within capacitor 11 is dissipated within the energy dissipation period which follows the disenabling of sampling gate 6. Threshold device 13, which could be a Schmitt trigger, is coupled to storage circuit 7 and will enable AND gate 14 as long as the voltage across the storage circuit is more negative than threshold level 16. Therefore, an enabling mark is applied to the upper terminal of AND gate 14 which may be represented by pulse 17 of FIG. 2. Accordingly, the width of pulse 17 represents the time interval in which the energy within storage circuit 7 is above a predetermined level. The output terminal of AND gate 14 is coupled to the input terminal of pulse counter 9. Pulse train generator 18 produces relatively high frequency pulses which pass through AND gate 14 during the interval defined by pulse 17. The resulting count could be represented as a binary output, as indicated in FIG. 1. Just before the next sampling interval is generated by timing pulse generator 8 to enable AND gate 6, a mark is produced by the generator upon lead 19 which resets counter 9 so that the counter is prepared for the next sample.

In communication applications, analog input source 1 may produce an audio voice wave. This A.C. wave would cause fluctuations in the D.C. level impressed upon the output terminal of low-pass filter 4 by negative voltage terminal 3. Let it be assumed that just before the next sampling interval, the voltage applied to AND gate 6 is minus five units instead of the minus ten unit steady state voltage (zero voltage units input) which produced waveform 12 of FIG. 2. This would indicate an input of plus five voltage units. Under these circumstances, waveform 21 would be produced which, in turn, would enable AND gate 14 during the time interval defined by pulse 22. If the frequency of the pulse train produced by generator 18 were adjusted so that the aforementioned steady state D.C. voltage which produced pulse 17 would cause the registration of a count of ten indicative of minus ten voltage units, pulse 22 which represents plus five input voltage units would cause the registration of a count of five within counter 9. Now let it be assumed that the voltage produced by analog input source 1 would have an amplitude of minus five voltage units. Under these circumstances, minus fifteen voltage units would be applied to AND gate 6 and waveform 23 would be generated, thereby to enable AND gate 14 during an interval defined by pulse 24. This interval would cause a count of fifteen to be built up within counter 9. In summary, the enabling period of AND gate 14 which directly controls the final count of counter 9 will be directly proportional to the amplitude of the sampled analog voltage across the filter output terminals over the operating range. The charging time constant of the circuit which includes AND gate 6 and capacitor 11 should be as small as possible. In order to have linear conversion the trigger level should be set so that only up to ten percent of the time constant of the discharge curve is used for analog-to-digital conversion. This is likewise true for the second embodiment described hereinafter, where the discharge curve would be the envelope of the decaying oscillations. The sampling intervals was .4 microsecond and the sampling rate was ten kilocycles for the converter built in the laboratory. In a telephone transmission system, the binary count of ten could be decoded at the receiver by a "weighted" resistance ladder or similar device. Variations of the count within the operating range would be integrated by the filter at the receiver to reproduce the audio input wave. For general purpose D.C. analog-to-digital conversion, the D.C. analog source would be connected in series with the bias voltage terminal 3.

In the second embodiment of the present invention disclosed in FIG. 3, a tank circuit 27 was utilized in place of the RC storage circuit of FIG. 1. The energy produced by sampling is applied to tank circuit 27 by virtue of sampling gate 28. Tank circuit 27 is a relatively high Q circuit which is shocked into oscillation or "rung" by the sampling process. Threshold level 29 of FIG. 4 is established by threshold device 31 as in the embodiment of FIG. 1. Accordingly, the voltage swings due to ringing which are above a predetermined magnitude are counted by counter 32. The greater the amplitude of the sampled analog signal, the greater the number of voltage swings above a predetermined magnitude and, hence, the greater the count set up in the counter. The circuit parameters could be selected so that a voltage of minus three units applied to the upper input terminal of AND gate 28 will cause waveform 33 to be applied to threshold device 31. Since three voltage swings within the tank circuit will exceed threshold level 29 of FIG. 4, a count of three will be manifested within counter 32. In the event that a minus six unit analog signal is sampled by AND gate 28, wave shape 34 will be produced across tank circuit 27 and a count of six would be manifested within counter 32 since six voltage swings exceed threshold level 29, as shown in FIG. 4. The Q of the tank circuit would be adjusted to attain these results.

The selected Q would in practice be a function of the time interval between samples, the range of the sample voltage, and the desired number of quantum steps. The less the range of the sampled voltage and the higher the required number of quantum steps the higher the Q. On the other hand, the smaller the interval between samples the less the Q, since faster ring out would be required. The shorter the interval between samples and the higher the number of quantum steps the higher the frequency of the tank circuit. The actual operating conditions would, in telephone practice, be similar to those of the first embodiment; that is, the analog input voltage applied to tank circuit 27 would fluctuate about the D.C. level produced by negative terminal 36, so that the count within counter 32 will fluctuate about a particular level in step with fluctuations in the audio input signal.

Counter 32 is reset just before the enabling of AND gate 28 as in the first embodiment of FIG. 1.

In the constructed converter of FIG. 1, capacitor 11 was 4.37 nanofarads and resistor 20 was 100K ohms. In the constructed converter of FIG. 3, the tank circuit included an 8.2 nanofarads capacitor, a 12 microhenry inductor and a 4.7K ohms shunt connected resistor.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. An analog-to-digital converter for providing a digital output which is representative of the amplitude of a sampled portion of an analog signal comprising an analog signal source, an energy storage circuit, means coupled between said analog signal source and said energy storage circuit for sampling the amplitude of said analog signal during a predetermined sampling period and for inserting a quantity of electrical energy into said energy storage circuit during said sampling period to build up energy within said energy storage circuit which is a function of the sampled amplitude of said analog signal, means for dissipating said electrical energy inserted into said energy storage circuit over an energy dissipation period, and means coupled to said energy storage circuit for measuring the time interval in which the energy level within said energy storage circuit remains above a predetermined level which is a function of said sampled amplitude.

2. The combination as set forth in claim 1 wherein said means for measuring further includes a pulse counter, a threshold device having an input and output circuit for producing an output signal upon its output circuit as long as the energy in said storage circuit remains above a particular level, an AND gate having a first and second input terminal and an output terminal, means for coupling the output circuit of said threshold device to the first input terminal of said AND gate, a pulse train generator for producing a pulse train having a period which is small compared to said energy dissipation period, means for coupling said pulse train generator to the second input terminal of said AND gate, and means for coupling the output terminal of said AND gate to the input circuit of said counter.

3. The combination as set forth in claim 1 wherein said energy storage circuit includes an inductance and a capacitance connected to form an oscillatory circuit and said means for measuring further includes a device coupled to said oscillatory circuit for producing a count signal for each oscillation produced in said oscillatory circuit by sampling said analog signal source that exceeds a predetermined magnitude, and means coupled to the output circuit of said last-named means for counting said count signals after each of said sampling intervals.

4. An analog-to-digital converter for providing a digital output which is representative of the amplitude of a sampled portion of an analog signal comprising an analog signal source, a storage circuit including a capacitor, means coupled between said analog signal source and said storage circuit for sampling the amplitude of said analog signal source during a predetermined sampling period and for inserting a quantity of electrical energy into said capacitor during said sampling period to build up a voltage across said capacitor which is a function of the sampled amplitude of said analog signal means for dissipating said electrical energy inserted into said capacitor over an energy dissipation period, and means coupled to said storage circuit for measuring the time interval in which the energy level of said quantity of electrical energy within said storage circuit remains above a predetermined level which is a function of said sampled amplitude.

5. The combination as set forth in claim 4 wherein said storage circuit includes a resistance coupled to said capacitor for discharging said capacitor and said means for measuring further includes a threshold device coupled to said capacitor which threshold device produces an output signal at its output circuit as long as the voltage across said capacitor exceeds a predetermined level, an AND gate having a first and second input terminal and an output terminal, means for connecting the output circuit of said threshold device to the first input terminal of said gate to enable said gate as long as said output signal is produced by said threshold device, a pulse counter, means for applying a fixed frequency pulse train having a small period compared to the sampling period to the second input terminal of said gate, and means for coupling the output terminal of said gate to the input terminal of said pulse counter.

6. The combination as set forth in claim 4 wherein said storage circuit includes an inductor coupled to said capacitor to form an oscillatory circuit and said means for measuring further includes a threshold device coupled to said oscillatory circuit for producing a count signal each time the voltage swing caused by oscillations within said oscillatory circuit exceeds a predetermined voltage level, and means coupled to the output circuit of said threshold device for counting said count signals after each of said sampling intervals.

References Cited by the Examiner

UNITED STATES PATENTS 3,188,455  6/1965  Quick _____ 340—347

MAYNARD R. WILBUR, *Primary Examiner.*

DARYL W. COOK, *Examiner.*

K. R. STEVENS, W. J. KOPACZ, *Assistant Examiners.*